(12) United States Patent
Venkatesh et al.

(10) Patent No.: US 11,715,050 B2
(45) Date of Patent: Aug. 1, 2023

(54) SCHEDULING ENGINE

(71) Applicant: Walmart Apollo, LLC, Bentonville, AR (US)

(72) Inventors: Sasikumar Venkatesh, Bengaluru (IN); Abhishek Giridhar Shenoy Adde, Udupi (IN); Rohith S. Pal, Bangalore (IN); Ravindra Mishra, Nainital (IN); Kyle Thomas McHan, Springdale, AR (US); Arnabh Bhaumik, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 32 days.

(21) Appl. No.: 17/092,686

(22) Filed: Nov. 9, 2020

(65) Prior Publication Data

US 2022/0147907 A1    May 12, 2022

(51) Int. Cl.
*G06Q 30/00* (2023.01)
*G06Q 10/0631* (2023.01)
*G06Q 10/0637* (2023.01)

(52) U.S. Cl.
CPC ......... *G06Q 10/063118* (2013.01); *G06Q 10/06312* (2013.01); *G06Q 10/06315* (2013.01); *G06Q 10/06375* (2013.01); *G06Q 10/063116* (2013.01)

(58) Field of Classification Search
CPC ... G06Q 10/063118; G06Q 10/063116; G06Q 10/06312; G06Q 10/06315; G06Q 10/06375; G06Q 10/06395; G06Q 10/00; G06Q 10/02; G06Q 10/06; G06Q 10/10; G06Q 30/02; G05B 2219/31357
See application file for complete search history.

(56) References Cited

U.S. PATENT DOCUMENTS 7,222,082 B1    5/2007   Adhikari et al.
7,827,041 B2   11/2010   Roberts et al.
9,311,449 B2    4/2016   Levin et al.
(Continued)

OTHER PUBLICATIONS

Salsingikar, Shripad & Ganesan, Viswanath & Sengupta, Siddhartha. (2006). "Labor scheduling in retail stores" (Year: 2006).*
(Continued)

*Primary Examiner* — Robert D Rines
*Assistant Examiner* — Jay-Ming Wang
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform generating a staffing demand; applying a smoothing algorithm to normalize the respective time intervals; rounding the respective minimum number of staff for the each of the staffing roles; analyzing the respective minimum number of staff across the staffing roles in the proposed staffing schedule for compliance with a ratio compliance standard; and transmitting the respective proposed staffing schedule to a respective interface of a respective user device for each of the one or more stores. Other embodiments are disclosed.

20 Claims, 10 Drawing Sheets

(56) References Cited

U.S. PATENT DOCUMENTS

| | | | | |
|---|---|---|---|---|
| 2001/0032029 | A1* | 10/2001 | Kauffman | G06Q 10/06316 700/106 |
| 2002/0147622 | A1* | 10/2002 | Drolet | G06Q 10/06315 705/7.25 |
| 2007/0061183 | A1* | 3/2007 | Seetharaman | G06Q 10/06 705/7.13 |
| 2007/0087756 | A1* | 4/2007 | Hoffberg | G06Q 10/06375 455/450 |
| 2009/0099862 | A1* | 4/2009 | Fireman | G16H 20/00 705/2 |
| 2014/0108034 | A1* | 4/2014 | Akbay | G06Q 10/06315 705/2 |
| 2015/0286982 | A1* | 10/2015 | Dwyer | G06Q 10/067 705/7.17 |
| 2016/0171422 | A1* | 6/2016 | Wicaksono | G06Q 10/063118 705/7.17 |
| 2017/0052536 | A1* | 2/2017 | Warner | G06Q 10/06312 |
| 2017/0098181 | A1* | 4/2017 | Herman | G06N 20/00 |
| 2019/0334907 | A1* | 10/2019 | Rodden | H04L 67/54 |

OTHER PUBLICATIONS

The Intelligent Workforce Management Solutions Suite, accessed on Dec. 13, 2021 at https://www.nice.com/engage/workforce-management/.

NICE WFM Team, with U. Jagare, Workforce Management AI-Based Forecasting for Dummies, John Wiley & Sons Ltd. 2020 2020.

U.S. Dept. of Health and Human Services, Health Resources and Services Administration, National Center for Health Workforce Analysis. Technical Documentation for HRSA's Health Workforce Simulation Model. Rockville, MD: U.S. Dept of Health and Human Services, 2017 (114 pgs) 2017.

* cited by examiner

| Simulation Name | No. of Stores | Created By | Created Date | Modified Date | Effective Date | Status | |
|---|---|---|---|---|---|---|---|
| Test_20200609_1 | 1 | Sachin Thirumala | 06-09-2020 03:08 am | | | Running | ↻ |
| Test Sim | 5199 | Gowthamraman Subbaraman | 06-20-2020 11:36 am | | | Completed | ☐ PUBLISH |
| test-name | 452 | Lian Shi | 05-27-2020 09:53 am | 05-27-2020 09:54 am | | Draft | ✎ ☐ |
| test-name | 3 | Lian Shi | 05-27-2020 09:43 am | | | Draft | ✎ ☐ |
| Simulation Testing | 1 | Devarinti Vanitha | 05-27-2020 12:57 am | | | Completed | ☐ PUBLISH |
| TX Stores Simulation | 591 | Sasi | 05-18-2020 11:30 am | | | Draft | ✎ ☐ |
| TestJS-RunSuccess | 5202 | Jeff SIMSON - Vendor | 05-14-2020 02:50 pm | 05-14-2020 02:51 pm | | Completed | ☐ PUBLISH |
| testing | 1 | Devarinti Vanitha | 04-08-2020 01:19 am | | | Completed | ☐ PUBLISH |
| Simulation test | 5202 | Abhishek Shenoy | 03-31-2020 04:27 am | | | Completed | ☐ PUBLISH |
| web socket test | 5204 | Mohan Chaladi | 03-12-2020 12:13 am | | | Completed | ☐ PUBLISH |

FIG. 9

SCHEDULING ENGINE

TECHNICAL FIELD

This disclosure relates generally relates to a scheduling engine.

BACKGROUND

Generally, creating a staffing schedule for a store providing regulated service can be dependent on static data that relies on estimates of demand associated with the hours of operation of the store. In general, staffing schedules can become unreliable in the face of changes for demand and/or changes in applicable government laws and regulations. Often, staffing schedules cannot easily adjust to demand changes in a timely or efficient matter. Creating a new staffing schedule to account for changes in demand can be time consuming and laborious.

BRIEF DESCRIPTION OF THE DRAWINGS

To facilitate further description of the embodiments, the following drawings are provided in which:

FIG. 9. illustrates an exemplary user interface display, according to another embodiment.

Figure 1:
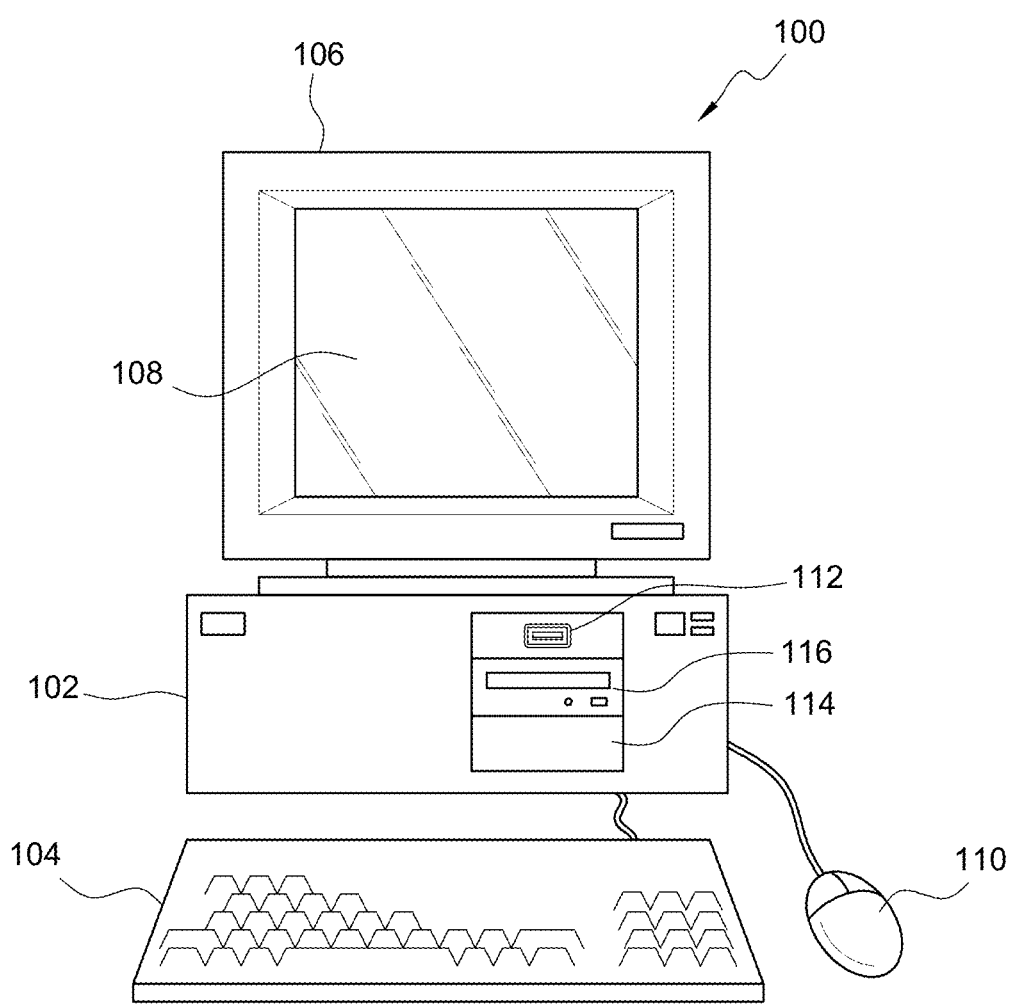
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
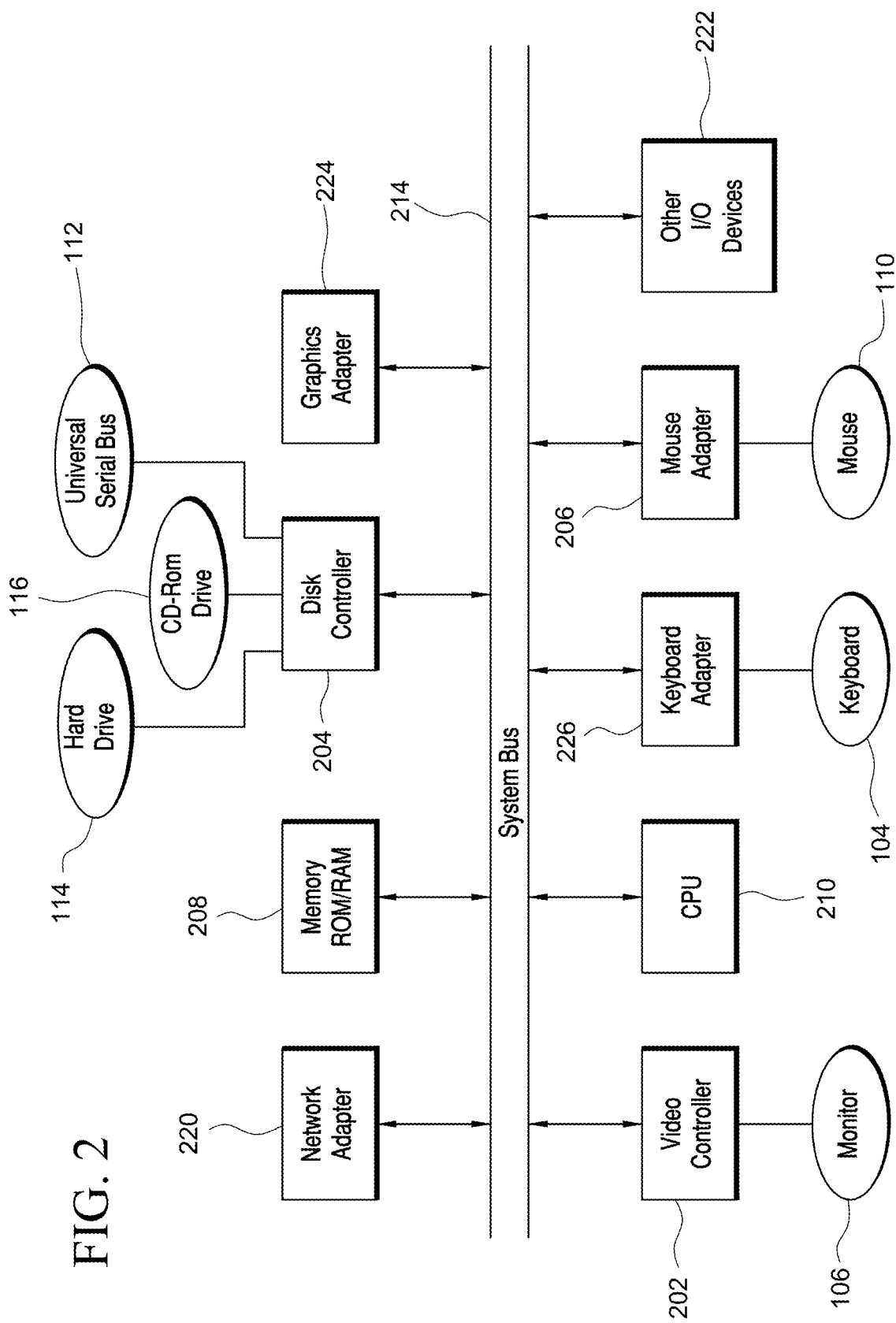
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
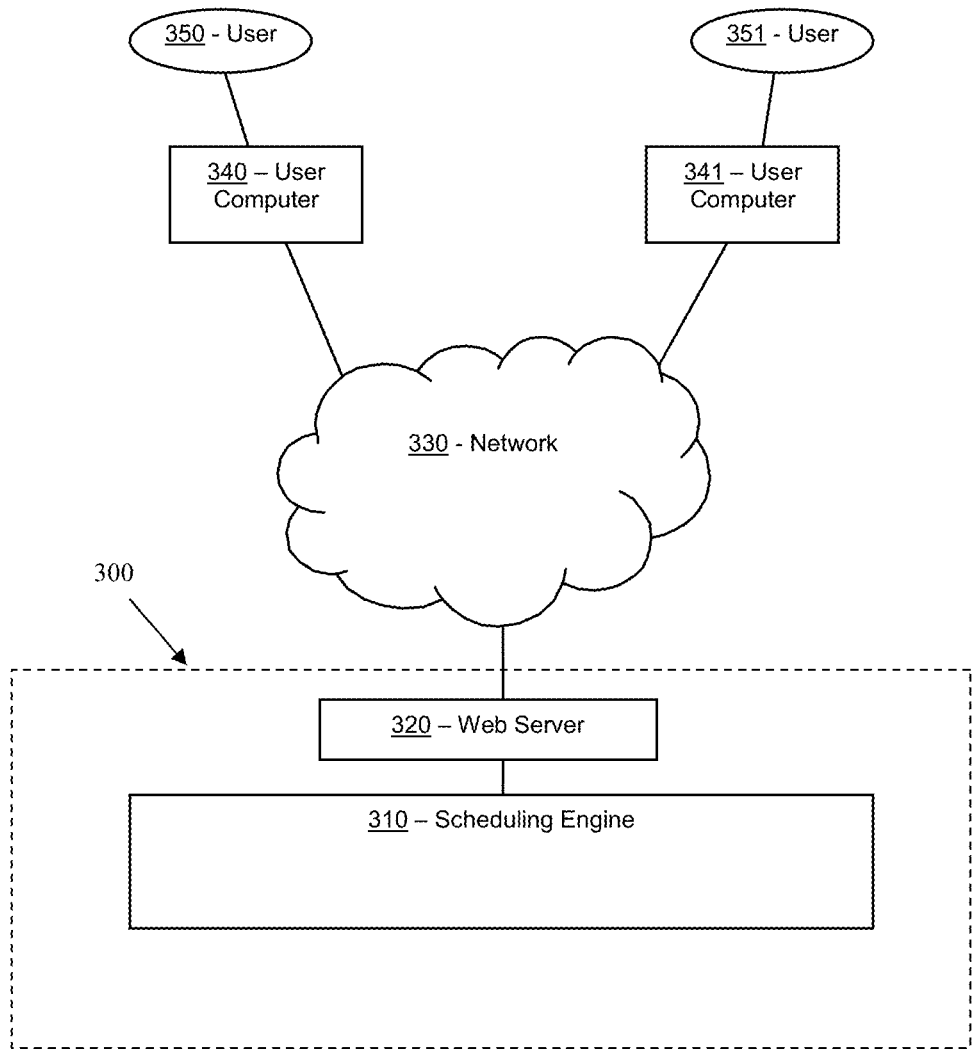
FIG. 3 illustrates a block diagram of a system that can be employed for generating staff-related scheduling guidelines to determine a number of employees to be staffed across a store by a given set of time periods, according to an embodiment.

Turning ahead in the drawings, FIG. 3 illustrates a block diagram of a system 300 that can be employed for generating staff-related scheduling guidelines to determine a number of employees to be staffed across a store by a given set of time periods, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a scheduling engine 310 and/or a web server 320. Scheduling engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host all of scheduling engine 310 and web server 320. Additional details regarding scheduling engine 310 and/or web server 320 are described herein. In a number of embodiments, each of scheduling engine 310 and/or web server 320 can be a special-purpose computer programed specifically to perform specific functions not associated with a general-purpose computer, as described in greater detail below.

In some embodiments, web server 320 can be in data communication through a network 330 with one or more user computers, such as user computers 340 and/or 341. Network 330 can be a public network, such as the Internet, or a private network. In some embodiments, user computers 340 and 341 can be used by users, such as users 350 and 351, respectively, which also can be referred to as users running simulations, users associated with a store, or customers of the users, in which case, user computers 340 and 341 can be referred to as customer computers or user computers. In many embodiments, web server 320 can provide access to scheduling engine through a web interface and/or application (app) interface In some embodiments, an internal network that is not open to the public can be used for communications between scheduling engine 310 and/or web server 320 within system 300. Accordingly, in some embodiments, scheduling engine 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, scheduling engine 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to scheduling engine 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of scheduling engine 310 and/or web server 320. In a similar manner, the processors and/or the non-transitory computer-readable media can be local and/or remote to each other.

Meanwhile, in many embodiments, scheduling engine 310 and/or web server 320 also can be configured to communicate with and/or include one or more databases and/or other suitable databases. The one or more databases can include an item database that contains information about items or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between scheduling engine 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, scheduling engine 310 can be used to run simulations based on varying input parameters, components, and/or drivers selected across several stages or series of processes, and/or algorithms using a scheduling engine.

In some embodiments, using scheduling engine 310 can begin by first generating a staffing demand for a store. In several embodiments, generating data for such a staffing demand can include determining a number of people to employ during the hours of operation of the store or multiple stores. In many embodiments generating a staffing demand for a store also can include processes, such as: determining forecasted tasks associated with services provided by a store, mapping each task using a standard filing approach from the time a task is initiated to a time of completion, applying a legal standard applicable to a jurisdiction and/or location of the store, and other suitable drivers. In many embodiments, scheduling engine 310 also can create a first simulation of a proposed staffing schedule by modifying a single input parameter (e.g., driver) or by implementing a new process (e.g., technology) to be used by a store.

Figure 4:
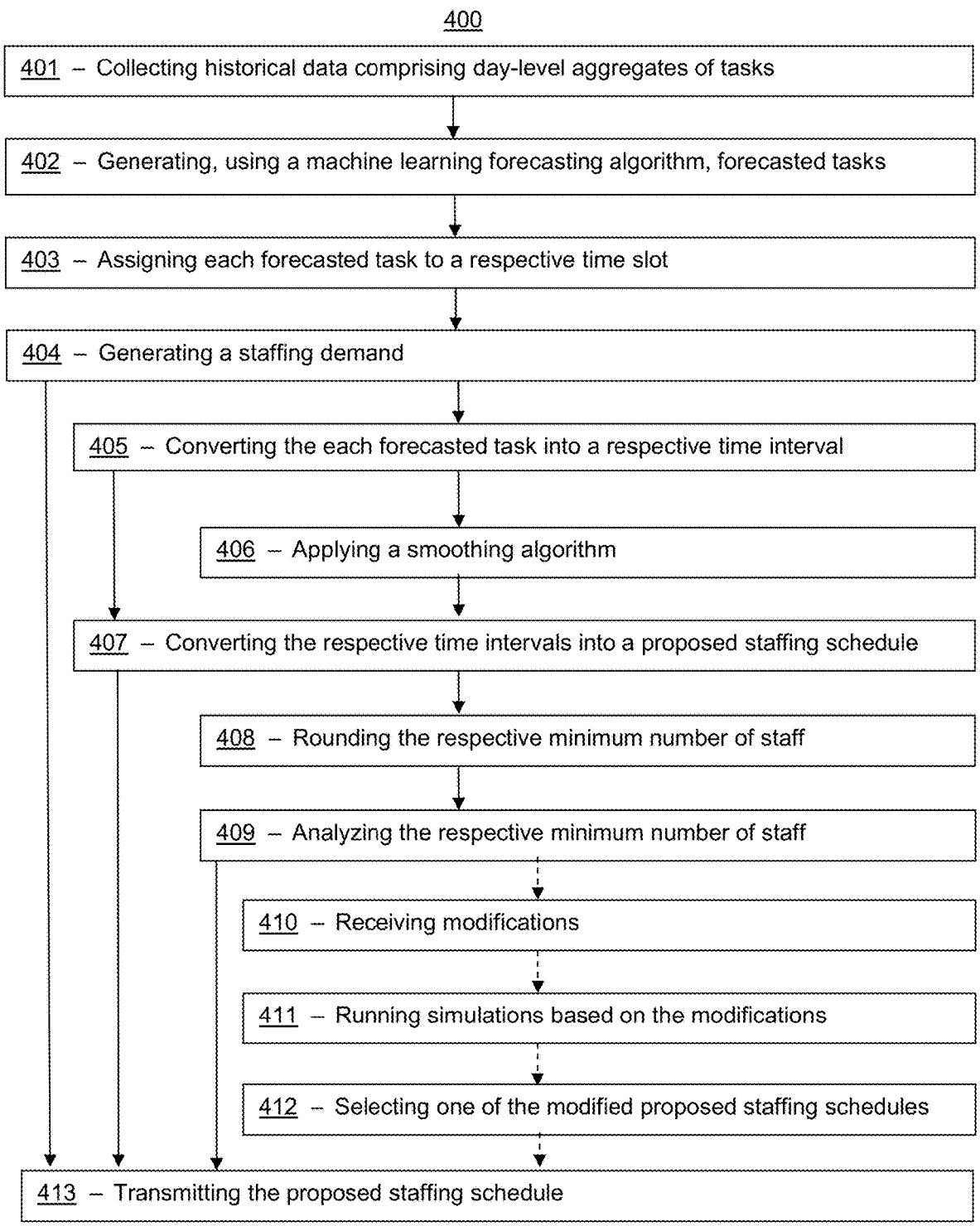
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically running simulations to determine a customized (e.g., optimized) staffing schedule based on respective input parameters by using a scheduling engine. In some embodiments, running simulations using a scheduling engine can be implemented on a computing device, such as computer system 100 (FIG. 1), through an interactive user interface, such as is illustrated in FIGS. 6-10 and described below.

Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as scheduling engine 310 (FIG. 3) and/or web server 320 (FIG. 3). The processor(s) can be similar or identical to the processor(s) described above with respect to computer system 100 (FIG. 1).

Referring to FIG. 4, method 400 can include a block 401 of collecting historical data can include day-level aggregates of tasks performed during each day across a historical time period for one or more stores. In some embodiments, collecting historical data can include aggregating individual data for each individual task that can be performed and completed in a single day. In several embodiments, aggregating the day-level data for a store and/or multiple stores can span a predetermined period of time for use in generating a relevant demand for services, such as 1 year, 2 years, 3 years, or another suitable number of years and/or months. The terms parameters, variables, components, or drivers can be used interchangeably to describe inputs used in scheduling engine approaches. For example, a change or modification of such a variable, parameter, component, or driver can be include an event or a set of events that can change a number of people previously recommended in a staffing schedule to staff a store. Such a modification can impact the number of people recommended to employ by either reducing the number or increasing the number of people.

In several embodiments, the historical time period for the one or more stores can be at least 2 years. In various embodiments, the historical time period for the one or more stores also can be at least 3 years, 4 years, or another suitable period of time in which to monitor, collect, and store the historical data for each driver and/or parameter of a demand for services during a particular time period. In several embodiments, collecting historical data for a lengthy time period (e.g., 2 years or more) can begin a process of forecasting a demand for services where the data can serve as the foundation or base for determining demand trends for services and creating hard data composing the actual types of services (e.g., tasks and sub tasks) performed throughout each day for that time period and the role of the one or more employees taken in performing these tasks for each day.

In a number of embodiments, the tasks performed during each day across the historical time period can include tasks associated with prescriptions. In various embodiments, the tasks performed during each day further can include services that can be associated with administering prescriptions, such as administering immunizations, pharmaceutical counseling, entering insurance information, or other suitable tasks performed each day in the one or more stores. In many embodiments, the one or more stores can include one or more pharmacies. The one or more stores further can include one or more retail stores, or another suitable store that employs people to perform certain tasks or services. The one or more stores further can include one or more facilities offering services that can be subject to a ratio compliance standard, such as state law, a regulation, a compliance standard, and another legal restrictions or regulations for such services.

In various embodiments, method 400 also can include a block 402 of generating, using a machine learning forecasting algorithm, forecasted tasks to be performed during an upcoming time period at the one or more stores at a day-level, based on the historical data. In several embodiments, the data collected from the day-level aggregates can be run through the machine learning forecasting algorithm. Such a machine learning forecasting algorithm can take the inputted data and can convert and/or distribute the inputted data from a single day-level collection of data into individual time intervals for upcoming time periods, where the individual time intervals can be 15 minutes, 20 minutes, or another suitable time period, during the hours of operation of the store.

In several embodiments, input data when training a machine learning forecasting algorithm can include historical data, such as the day-level tasks of the day-level aggregate data performed during a time period at the one or more stores. In various embodiments, an output of the machine learning forecasting algorithm can include the individual time intervals for each of the tasks performed during a time period. In many embodiments, machine learning forecasting algorithms can include a time series forecasting approach based on an additive model where nonlinear trends are within a pre-determined time interval. In various embodiments, machine learning forecasting algorithms additionally can include a time series analysis method of forecasting, such as a seasonal and trending (STL) decomposition statistical model. In some embodiments, the machine learning forecasting algorithm further can include an STL decomposition statistical model with autoregressive integrated moving average (ARIMA) models. In various embodiments, machine learning forecasting algorithms also can include methods of statistical forecasting, such as random forests, regression analysis, another suitable decomposition method, and/or a smoothing technique used to generate an output of the individual time intervals for the tasks performed during a time interval during a time period.

In some embodiments, the upcoming time period can be at least 15 weeks. In various embodiments, the upcoming time period can be another suitable period of time.

In some embodiments, the forecasted tasks can include receiving prescriptions, filling prescriptions, and picking up prescriptions. In various embodiments, the forecasted tasks also can include other suitable tasks associated with providing services of a store unrelated to prescriptions.

In many embodiments, method 400 additionally can include a block 403 of assigning each forecasted task of the forecasted tasks to a respective time slot of predetermined time slots for each of the one or more stores. In various embodiments, a duration of each of the respective time slots of the predetermined time slots can be at least 15 minutes. In some embodiments, the predetermined time slots can be another suitable duration of time.

In a several embodiments, method 400 also can include a block 404 of generating a staffing demand. In some embodiments, generating the staffing demand can be implemented using scheduling engine 310 (FIG. 3). In various embodiments, scheduling engine 310 (FIG. 3) can generate an output indicating a proposed staffing schedule or an initial simulation of staff scheduling recommendations based on a particular set of input parameters. In many embodiments, output generated by the staffing demand can include the second or next simulation run by scheduling engine 310 (FIG. 3) by simply changing a single driver in the second simulation. In some embodiments, output generated by the staffing demand further can include receiving multiple simulations with multiple proposed staffing schedules by changing and/or modifying any one input parameter (e.g., driver) that can result in impacting or adversely affecting current staffing parameters across staffing roles for a store. In many embodiments, scheduling engine 310 (FIG. 3) can include components or drivers to run each simulation to generate a staffing demand or a store-specific schedule guideline. In various embodiments, the components or drivers can be run in parallel during each simulation generating the staffing demand. The terms components or drivers can include a set of events or parameters or variables that can impact or drive a demand in one direction, an opposite direction, and/or another suitable direction.

In several embodiments, the components or drivers used to run each simulation that generates a staffing demand and/or a store specific schedule guideline can include: (i) forecasting of tasks to be performed within an interval of time, (ii) mapping each task to a database over a period of time, (iii) applying a smoothing algorithm for the tasks during the period of time, (iv) applying a rounding algorithm for the number of people to be employed to perform the tasks over the period of time, and/or (v) checking that a proposed staffing schedule is in compliance with any and all applicable legal standards for the store under the jurisdiction of government laws and regulations.

In many embodiments, the scheduling engine can run simulations that can output modified proposed staffing schedules by incorporating suitable modifications, such as a change in a state regulation that can involve an adjustment to the ratio of certain staffing roles that match other staffing roles, as shown in block 409 and described below. For example, a simulation can be run based on a set of drivers that can produce (e.g., output) a staffing schedule involving a certain number of employees in a certain number of roles to be able to perform the tasks associated with a demand over a period of time. In an example, the services can be performed by a pharmacy. Further in this example, a ratio of a certain number of employees working in a certain number of roles can be in a compliance with all state and other regulatory laws in effect for a pharmacy. A proposed staffing schedule can recommend that a pharmacy located in a state (e.g., Arkansas) should conduct business hours of operation from 9 a.m. to 9 p.m. on a certain day of the week. More specifically, the proposed staffing schedule can recommend the store employ 2 pharmacists, 4 technicians, and 6 sales personnel (e.g., cashiers) to meet the forecasted demand for services during those hours. However, a state regulatory body can regulate a minimum ratio of a number of pharmacists to employ for a number of technicians during an eight hour period, thus the proposed staffing schedule can be adjusted to add or subtract an additional pharmacist and/or an additional technician during those hours of operation specific to a jurisdiction where the pharmacy is located within the borders surrounding the state. Additionally, in many embodiments, a change in a state regulation adjusting the ratio of certain staffing roles that match other staffing roles can have no impact or change on the proposed staffing schedule, as described below in connection with block 409.

In various embodiments, block 404 of generating a staffing demand also can include a sequential procedure be implemented to generate a demand for services. In many embodiments, a raw demand can include input data (e.g., input parameter) and output data (e.g., output parameter) to determine the time taken and/or used by each staffing role to complete each activity of multiple activities for each task or driver. In several embodiments, the raw demand can be determined by (i) multiplying each driver by each respective time interval or each respective standard of time, and/or (ii) aggregating each driver of multiple drivers and the respective time interval associated with a measure of time it took to complete the driver within each time period. For example, a time period can be one of each 15-minute periods within an hour (e.g., 4 time periods) during the hours of operation of a store. A driver can be associated with a measure of time of completion based on collecting historical data for that driver for that store. For example, a driver (e.g., pickup driver) can be associated with a time of completion (e.g., 10 seconds). Collecting the number of drivers that can be performed within the 15-minute period can depend on the number of staff available and qualified to perform each task or driver.

In some embodiments, the input data to generate the raw demand can be based on a number of forecast intervals and/or a number of forecasted tasks completed during a time interval for a store and/or for one or more stores. In several embodiments, time intervals for the raw demand can be assigned and/or parsed out at a 15 minute interval of time for each hour of operation per day of one or more stores. For example, a first 15 minute interval of time can contain a number of tasks and subtasks completed during that interval. Then a second 15 minute interval of time can contain another number of tasks and subtasks completed during the second 15 minute interval, and so on for the hours of operation of the store that day. The number of tasks can be similar for each interval of time and/or different. For example, in the first 15 minute interval of time for a pharmacy, the tasks performed can include taking 4 prescriptions, filling 2 of the four prescriptions, administering 2 immunizations, and sales of 5 items sold in a pharmacy. The second 15 minute interval of time can include filling the remaining 2 prescriptions, making 4 phone calls to an insurer, and counseling 4 patients regarding four filled prescriptions, and so on for the remaining time intervals that day.

In many embodiments, generating the raw demand using the input data for the one or more stores can yield output data of the time taken by each staffing role of each employee from the start of each task to completing each task performed within the time interval. For example, output data can subdivide or parse out each subpart of the entire task taken by one or more employees in one or more roles to fill a prescription. In this example, a task of filling a prescription can include subtasks performed by a pharmacist, subtasks performed by a technician, subtasks performed by a sales employee and/or other suitable subtasks taken to complete the task.

In a number of embodiments, method 400 further can include a block 405 of converting the each forecasted task at the respective time slot into a respective time interval taken by each staffing role of staffing roles to complete the each of one or more respective subtasks of the each forecasted task during the respective time slot. In many embodiments, subtasks can include additional activities or chores monitored by a time taken or used by an employee to perform the subtask that can be associated with a task. For example, such subtasks of a task can include mapping the time it can take an employee to place a label on a bottle, clicking a mouse to enter information, dealing with insurance disputes with insurers, or another suitable subtask used in performing a task.

In several embodiments, block 405 optionally can include determining the one or more respective subtasks using a database that maps the each forecasted task to the one or more respective subtasks. In some embodiments, each task and subtask can be measured by using engineering standards for accuracy rather than using generalized averages of time periods or estimations, such as an Enterprise Standards Management database or other suitable engineering standards. One advantage of using engineering standards is the increase in the level of accuracy in measuring or mapping time used to perform a task or subtask over conventional methods that often use generalized averages of time periods or based the measurements are estimations of time for each task or subtask. For example, measuring the time is takes to complete a task can be measured up to the hundredths of a second or better, without rounding down, such as it can take a person 18.27 seconds to put a label on a bottle as measured on a certain date during a certain time interval.

In some embodiments, block 405 further can include applying an uplift time period based on a relaxing factor for specific staffing roles of the staffing roles at specific stores of the one or more stores. In various embodiments, a relaxing factor for each time interval can be based on a percentage of an increase in demand based on the uplift time period for a particular store. For example, if an uplift factor is 10%, then the relaxing factor can increase the demand calculations by 10%.

Figure 6:
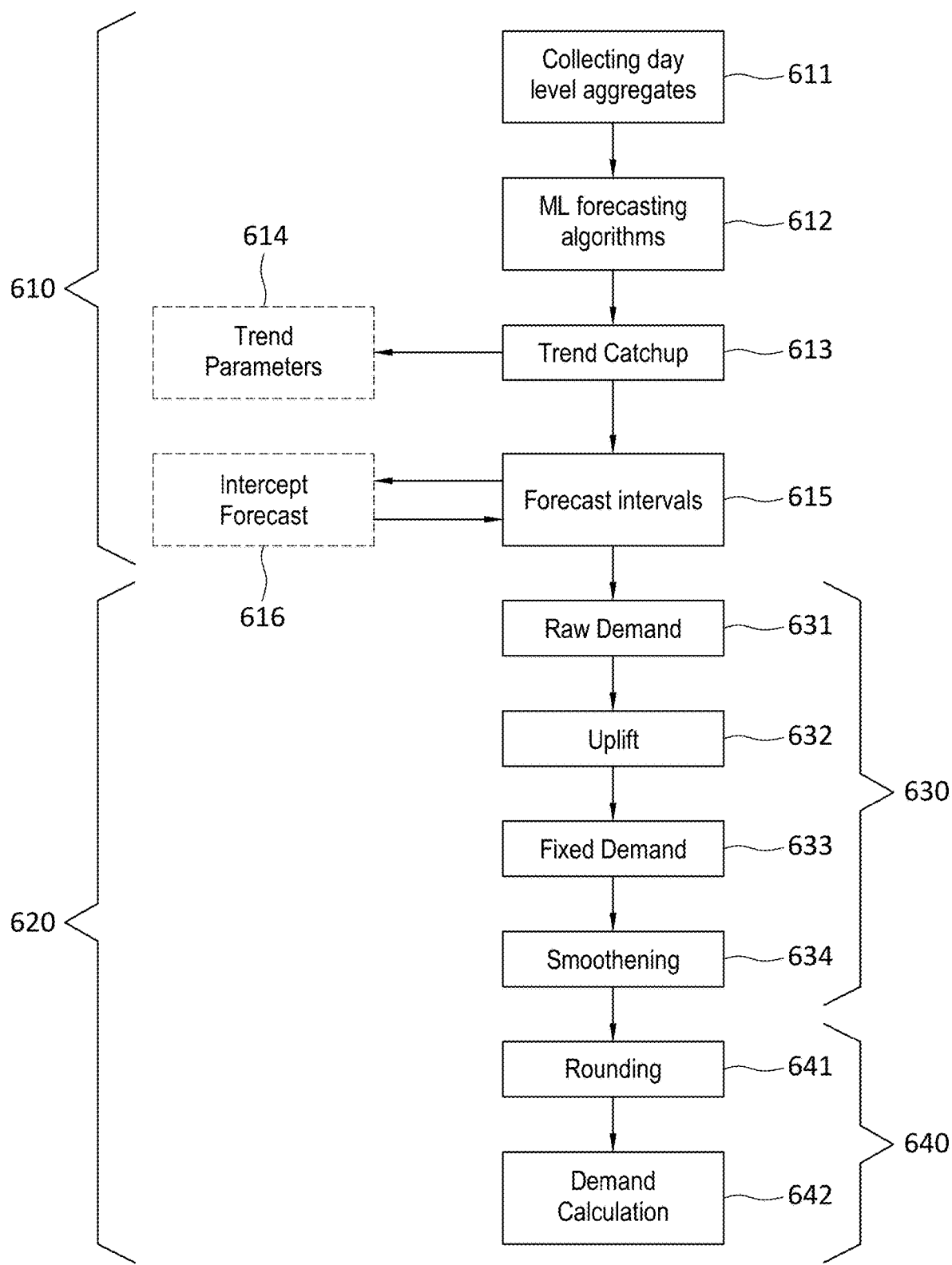
FIG. 6 illustrates a flow chart for a method, according to another embodiment.

In several embodiments, applying an uplift time period can be applied to the output data obtained from generating the raw demand. In many embodiments, an uplift time period can include uplift input data and uplift output data as another part of the sequential procedure for the demand generation process, as further described below in connection with block 632 (FIG. 6, described below).

In several embodiments, the uplift time period also can be based on historical demands of a store including demands that have not been quantified or accurately monitored. Such historical data can indicate a particular store has an actual higher demand than that what was input into the data used to determine the raw demand. In some embodiments, when historical demands indicate a higher or lower demand for a store, applying an uplift period can increase demand accuracy of the demand generation process.

In a number of embodiments, uplift input data can include time taken by an employee in a respective role to complete activities associated with tasks and/or subtasks for each driver during the time interval. In various embodiments, uplift output data can apply the relaxing factor to the time taken by each role to complete each task within the time interval period.

In various embodiments, block 405 also can include applying an additional fixed demand time for the specific staffing roles to perform one or more activities (e.g., tasks or chores) beyond the forecasted tasks. In many embodiments, a fixed demand time can include fixed demand input data and fixed demand output data as another part of the sequential procedure for the demand generation process, as further described below in connection with block 633 (FIG. 6).

In some embodiments, a fixed demand input can be applied to the uplift time period based on the forecasted demand at every time interval, such as every 15 minutes or another suitable time interval. In several embodiments, a process used in applying a fixed demand can be inversely assigned a time period for an employee to complete other minimal chores per a staffing role based on a time interval period. The fixed demand can include non-priority tasks performed and completed during a period of time when a current demand falls below what can be provided by the staff working in particular staffing roles working to perform certain priority tasks during the time interval. Such non-priority tasks can include re-stocking items and/or other suitable minimal chores to be completed during the hours of operation of a store per a day, a week, or a month or another suitable period of time.

In many embodiments, method 400 additionally can include a block 406 of applying a smoothing algorithm to normalize the respective time intervals performed across a window of multiple respective time slots of the predetermined time slots. In some embodiments, a smoothing algorithm can include smoothing algorithm input data and smoothing algorithm output data as another part of the sequential procedure for the demand generation process, as further described below in connection with block 634 (FIG. 6). In several embodiments, the smoothing algorithm input data can include the (i) time taken to complete activities per staffing role for each time interval, and (ii) the output of fixed demand.

In many embodiments, the smoothing algorithm output data can translate the input data into a scheduling environment and/or a smoothened output. As an example, by using the time intervals, a calculation for a staffing demand without applying the smoothing algorithm can include employing 2 pharmacists at 9 a.m., 2 pharmacists at 9:15 a.m., 5 pharmacists at 9:30 a.m., and 2 pharmacists at 9:45 a.m. In such an example, the number of employees to employ in certain staffing roles to perform the tasks and/or activities during each time interval can be translated into a real-world staffing schedule by applying the smoothing algorithm. Additionally, modifying any of the data or any assumptions using scheduling engine 310 (FIG. 3) can include running multiple simulations to cover staffing demands as simulated for each day, each week, or another suitable dates.

In several embodiments, block 406 of applying the smoothing algorithm also can include performing an average operation across a window of the multiple respective time slots to normalize the respective time intervals. In various embodiments, a process associated with the smoothing algorithm output data also can include normalizing the staffing demand spread by using the output of fixed demand for every time interval and performing the average operation using a group or a window of time intervals. In various embodiments, each value for a first time interval can be averaged with other time intervals before and after the first time interval for a smoothened value to avoid spikes or dips in a period of time. For example, if an output of a demand for a 15-minute time interval at 9:00 a.m. equals 5 and a new smoothened value equals 4, then the new smoothened value of 4 can be used for the 9:00 a.m. time interval.

In some embodiments, method 400 further can include a block 407 of converting the respective time intervals into a respective proposed staffing schedule for each of the one or more stores, the respective proposed staffing schedule comprising a respective minimum number of staff to employ for each of the staffing roles at each of the one or more stores during the each respective time slot of the predetermined time slots. In various embodiments, an algorithm also can be used to convert the time interval into a number of people to employ by each staffing role. For example, a calculation for a demand can indicate that a pharmacist role can be used for 17.87 minutes of work between 9 a.m. and 9:15 a.m. Such a calculation can convert the demand to employ one pharmacist during that time period. In following this example, similarly another calculation a staffing role for a pharmacist to complete a task of 22.56 minutes of work between 9:00 a.m. and 9:15 a.m. can suggest employing 2 pharmacists during that time period. In various embodiments, an interactive user interface can be designed to allow changing the algorithm then to run different simulations or scenarios to test how respective changes in the algorithm can positively or negatively impact the number of staffing roles during the overall hours of operation.

In many embodiments, block 407 optionally additionally can include comparing the respective minimum number of staff for the each of the staffing roles against historical minimum staffing criteria and task capabilities of the each of the staffing roles. In some embodiments, a minimum staffing criteria can refer to a set of rules and/or a pre-determined requirement for a minimum type of all staff members, such as a pharmacist, to be scheduled to perform the tasks during each time interval. In many embodiments, the minimum staffing criteria can include a default number of 1 even when a staffing demand is 0 for a time interval. For example, when the hours of operation for a pharmacy is from 9:00 a.m. to 9:00 p.m. and the minimum staffing criteria includes a pharmacist scheduled during all hours of operation, the demand can be set to 1 to satisfy the condition even when there is a demand of 0 for that time interval.

In various embodiments, method 400 also can include a block 408 of rounding the respective minimum number of staff for the each of the staffing roles based on the respective time intervals taken to perform the respective subtasks during the each respective time slot. In some embodiments, the time intervals can be rounded to a nearest number based on a rounding algorithm. In many embodiments, the rounding algorithm can include rounding algorithm input data and rounding algorithm output data as another part of the sequential procedure for the demand generation process, as further described below in connection with block 641 (FIG. 6). In some embodiments, a set of rules can be used to round out a time interval to represent a number of people to schedule during each time interval. For example, for a time interval of 15 minutes, 5 minutes can be rounded down to 1 person per time interval, 17 minutes can be rounded down to 1 person per time interval, or 23 minutes can be rounded up to 2 persons per time interval. The number of persons per time interval represents the number of people to be scheduled in each 15-minute time period, for example.

In some embodiments, the smoothened output can be used as the rounding algorithm input data where the rounding output data can include a number of people (e.g., employees, staffing roles) to be employed in each role to complete a task for a specific store. In many embodiments, the rounding algorithm output data can provide a number of staffing roles involved based on the demands for services of a store across any time interval during the hours of operation of that store. In a number of embodiments, the rounding algorithm can determine the number of people to be employed based on a range of the total time intervals when a store is in operation (e.g., open). For example, using a time interval of 15 minutes, the rounding algorithm output data can deduce a number of staffing roles for that 15 minute range of time, and for each and every other 15 minute time interval across the hours of operation of the store. In following with this example, when a store is open for 12 hours on a given day, the rounding algorithm output data can include approximately 48 individual time intervals.

In several embodiments, block 408 optionally additionally can include performing a comparison of a sum of the respective time intervals taken to perform the respective subtasks across the respective minimum number of staff for the staffing roles against predetermined ranges of total time.

In some embodiments, block 408 optionally also can include adjusting the respective minimum number of staff for the staffing roles based on the comparison of the sum against the predetermined ranges of total time. In several embodiments, the minimum staffing criteria can be based on the hours of operation of a store.

In many embodiments, method 400 additionally can include a block 409 of analyzing the respective minimum number of staff across the staffing roles in the proposed staffing schedule for compliance with a ratio compliance standard. In several embodiments, block 409 can include a demand calculation process that includes a minimum staffing table, a linked task approach, and an analysis of ratio compliance, as further described below in connection with block 642 (FIG. 6). In several embodiments, block 409 can measure or test the rounded algorithm output data against the minimum staffing criteria. In many embodiments, prior to generating a first simulation of a proposed schedule using scheduling engine 310 (FIG. 3), the demand calculation output can indicate an allocation of a number of people to be employed within a time interval that can be in compliance with applicable government rules and regulations of a particular jurisdiction or state.

In various embodiments, the Min Staffing criteria can be aggregated into a day-level schedule and can be composed into a Master Table indicating at any given point in time for any given staffing role (e.g., pharmacist, technician, sales), a matching number of a minimum number of employees to be present or employed at a store. In many embodiments, the Master Table can be created by converting the hours of operation for the store into a daily table logging each Min Staffing criteria for each time interval in the table. For example, when a pharmacy is open from 9:00 a.m. to 9:00 p.m., the Master Table for that day can include at least a minimum coverage of 1 for each time interval during the 12 hours of operation.

In a number of embodiments, the Min Staffing criteria can be used to verify that a simulation of a staffing schedule satisfies or covers this demand. In many embodiments, when the simulation of the staffing demand does not satisfy the Min Staffing criteria, a number of people can be added or subtracted from the simulation of the staffing schedule to cover the staffing demand set forth in the Min Staffing criteria.

In several embodiments, block 409 also can include a Linked Task criteria that can work in conjunction with the Min Staffing criteria in that it can be applied to offload or combine tasks among different staffing roles to avoid staffing more people than could be used to meet the demand. For example, in addition to tasks that can only be performed by a pharmacist, the pharmacist also can perform certain tasks of both a technician and a sales person. A technician can perform tasks of a sales person but not tasks of a pharmacist. A sales person can only perform sales related tasks or other related subtasks, not tasks of a pharmacist or a technician.

In many embodiments, the Linked Task criteria can be used to avoid over-staffing during the calculated demand process particularly when the Min Staffing criteria involves adding another particular staffing role to a staffing schedule, such as an additional pharmacist, when there is no demand to have additional people to perform the same tasks and subtasks. In some embodiments, applying the Linked Task criteria can be implemented by removing one staffing role after adding another different staffing role particularly when one or more tasks can be performed by the newly added staffing role or another staffing role. For example, adding another pharmacist can cause scheduling engine 310 (FIG. 3) to apply a Linked Task criteria indicating that a sales person can then be removed from the schedule since the pharmacist also can perform sales tasks.

In several embodiments, block 409 also can include applying a ratio compliance analysis by analyzing a proposed staffing schedule for compliance with government laws and regulations. For example, a government law or regulation can specify a ratio of a number of pharmacists to be employed per a number of technicians employed each day. Such a ratio compliance analysis can include matching a location of a store to the applicable ratio for each state in the United States for a regulated service, such as a pharmacy.

In some embodiments, method 400 optionally can include a block 410 of receiving modifications to at least one of one or more parameters used to generate the staffing demand, one or more of the forecasted tasks or the one or more respective subtasks associated with one or more of the forecasted tasks. For example, after a simulation run, a user (e.g., 350-351 (FIG. 3)) can view the results of the simulation. After viewing the results, the user can choose to modify various parameters, the number of staff, the number of hours of operation, or any combination of modifications, and then run a new simulation based on the one or more modifications. Such modifications can include editing the inputs and/or parameters, such as uplift parameters, fixed demand parameters, smoothing algorithm parameters, rounding algorithm parameters, and/or another suitable input, as shown in user interface displays 700 (FIG. 7) and 1000 (FIG. 10), all as described below.

In several embodiments, method 400 optionally also can include block 411 of running simulations based on the modifications to generate modified proposed staffing schedules. In many embodiments, running one or more new simulations using the updated parameters can be run in parallel of each simulation. For example, a user can run new simulations after specifying the modifications on a user interface, as shown in user interface displays 700 (FIG. 7), 800 (FIG. 8), 900 (FIG. 9) and 1000 (FIG. 10), all as described below. Such new simulations can include multiple different simulations and/or versions that can number in the hundreds and/or thousands of new simulations generated for a single store and/or multiple stores by editing or modifying a single parameter and/or a combination of parameters used to generate a proposed staffing schedule. A single parameter can be edited or modified multiple times to generate a new simulation for each edit and/or modification of the parameter. Similarly, a combination of parameters can be edited or modified multiple times to generate a new simulation for each edit and/or modification of the combination of parameters.

In various embodiments, method 400 optionally further can include block 412 of selecting one of the modified proposed staffing schedules generated in the simulations. For example, an output of modified proposed staffing schedules can include multiple versions of the staffing schedules and/or a list of modified schedules. Upon viewing the versions or the list, a user can select which staffing schedule to present to each store that can be customized to each demand of each store.

In many embodiments, method 400 also can include a block 413 of transmitting the respective proposed staffing schedule to a respective interface of a respective user device for each of the one or more stores.

Figure 5:
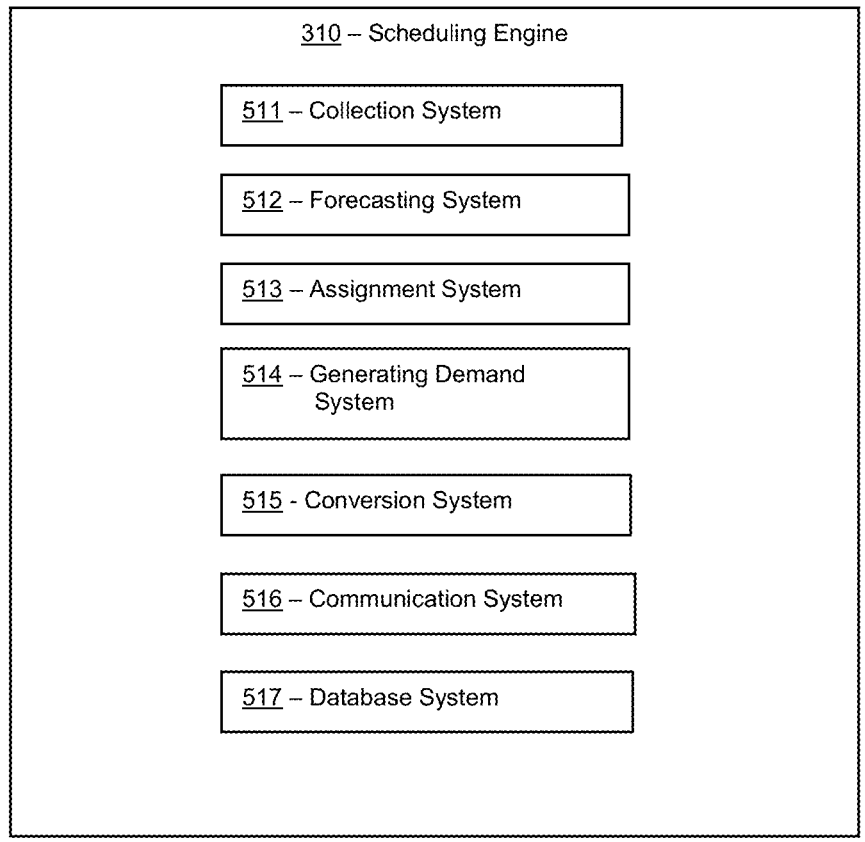
FIG. 5 illustrates a representative block diagram for a scheduling engine of FIG. 3.

Turning to the next drawing, FIG. 5 illustrates a block diagram of scheduling engine 310. Scheduling engine 310 is merely exemplary and is not limited to the embodiments presented herein. Scheduling engine 310 can be employed in many different embodiments or examples not specifically depicted or described herein. In some embodiments, certain elements or systems of scheduling engine 310 can perform various procedures, processes, and/or acts. In other embodiments, the procedures, processes, and/or acts can be performed by other suitable elements or systems. In many embodiments, the systems of scheduling engine 310 can be modules of computing instructions (e.g., software modules) stored at non-transitory computer readable media. In other embodiments, the systems of scheduling engine 310 can be implemented in hardware.

In many embodiments, scheduling engine 310 can include a collection system 511. In a number of embodiments, collection system 511 can at least partially perform block 401 (FIG. 4) of collecting historical data can include day-level aggregates of tasks performed during each day across a historical time period for one or more stores, and/or block 611 (FIG. 6, described below) of collecting day-level aggregates.

In several embodiments, scheduling engine 310 also can include a forecasting system 512. In various embodiments, forecasting system 512 can at least partially perform block 402 (FIG. 4) generating, using a machine learning forecasting algorithm, forecasted tasks to be performed during an upcoming time period at the one or more stores at a day-level, based on the historical data, block 610 (FIG. 6, described below) of generating a forecast, block 612 (FIG. 6, described below) of applying a machine learning forecasting algorithm, block 613 (FIG. 6, described below) of applying trend catchup, block 614 (FIG. 6, described below) of retrieving trend parameters, block 615 (FIG. 6, described below) of assigning forecast intervals, and/or block 616 (FIG. 6, described below) of intercepting a forecast.

In many embodiments, scheduling engine 310 further can include an assignment system 513. In several embodiments, assignment system 513 can at least partially perform block 403 (FIG. 4) of assigning each forecasted task of the forecasted tasks to a respective time slot of predetermined time slots for each of the one or more stores.

In some embodiments, scheduling engine 310 additionally can include a generating demand system 514. In many embodiments, generating demand system 514 can at least partially perform block 404 (FIG. 4) of generating a staffing demand, block 411 (FIG. 4) of running simulations based on the modifications to generate modified proposed staffing schedules, block 620 (FIG. 6, described below) of generating a demand, block 630 (FIG. 6, described below) of converting parameters into time periods taken by each staff role to perform a given activity of the parameter, and/or block 631 (FIG. 6, described below) of generating a raw demand.

In various embodiments, scheduling engine 310 also can include a conversion system 515. In some embodiments, conversion system 515 can at least partially perform block 405 (FIG. 4) of converting the each forecasted task at the respective time slot into a respective time interval taken by each staffing role of staffing roles to complete the each of one or more respective subtasks of the each forecasted task during the respective time slot, block 406 (FIG. 4) of applying a smoothing algorithm to normalize the respective time intervals performed across a window of multiple respective time slots of the predetermined time slots, block 407 (FIG. 4) of converting the respective time intervals into a respective proposed staffing schedule for each of the one or more stores, block 408 (FIG. 4) of rounding the respective minimum number of staff for the each of the staffing roles based on the respective time intervals taken to perform the respective subtasks during the each respective time slot, block 409 (FIG. 4) of analyzing the respective minimum number of staff across the staffing roles in the proposed staffing schedule for compliance with a ratio compliance standard, block 632 (FIG. 6, described below) of applying an uplift, block 633 (FIG. 6, described below) of applying a fixed demand, block 634 (FIG. 6, described below), of applying a smoothing algorithm, block 640 (FIG. 6, described below) of converting intervals of time to a number of people to employ, block 641 (FIG. 6, described below) of applying a rounding algorithm, and/or block 642 (FIG. 6, described below) performing a demand calculation.

In a number of embodiments, scheduling engine 310 further can include a communication system 516. In some embodiments, communication system 516 can at least partially perform block 410 (FIG. 4) of receiving modifications to at least one of one or more parameters used to generate the staffing demand, and/or block 413 (FIG. 4) of transmitting the respective proposed staffing schedule to a respective interface of a respective user device for each of the one or more stores.

In several embodiments, scheduling engine 310 additionally can include a database system 517. In various embodiments, database system 517 can at least partially perform block 412 (FIG. 4) of selecting one of the modified proposed staffing schedules generated in the simulations.

Turning ahead in the drawings, FIG. 6 illustrates a flowchart of method 600, according to another embodiment. Method 600 can include a sequential method of generating a first simulation of a staffing schedule, which, in some embodiments, can include 1) a forecast generation operation using historical staffing data, and/or 2) a demand generation operation converting data from the forecast generation operation into a number of people to employ during a time interval, as described below in block 610 and block 620. Method 600 can be similar to method 400 (FIG. 4), and various procedures, processes, and/or activities of method 600 can be similar or identical to various procedures, processes, and/or activities of method 400 (FIG. 4). Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more activities of method 600 can be implemented as one or more computing instructions configured to run at one or more processors and configured to be stored at one or more non-transitory computer-readable media. Such non-transitory computer-readable media can be part of a computer system such as scheduling engine 310 and/or web server 320. The processor(s) can be similar or identical to the processor(s) described above with respect to computer system 100 (FIG. 1).

Referring to FIG. 6, in many embodiments, method 600 can begin with a block 610 of generating a forecast. In several embodiments, generating a forecast can include a flow of data that can generate a demand for a period of time, such as 1 week, 2 weeks, 15 weeks, or another suitable period of time. A demand can be based on each parameter of multiple parameters or drivers and can be assigned by predetermined time intervals, such as 15 minutes, 30 minutes, or another suitable period of time within a specific range of time, such as the hours of operation of a store, a day, a week, or another suitable period of time.

In several embodiments, block 610 can include a block 611 of collecting day-level aggregates. Block 611 can be similar or identical to block 401 (FIG. 4). In various embodiments, collecting day-level aggregates can include collecting day-level aggregates for each parameter or driver associated with block 610 of generating a forecast.

In various embodiments, block 610 additionally can include a block 612 of applying a machine learning forecasting algorithm. Block 612 can be similar or identical to block 402 (FIG. 4). In many embodiments, a machine learning forecasting algorithm can be used to generate future weeks of staffing schedules based on the historical data for each day of each week, similarly as shown in block 402 (FIG. 4).

In several embodiments, block 610 further can include a block 613 of applying trend catchup. In various embodiments, trend catchup can include a process used to update a set of forecasts to accommodate an exogenous event or an unanticipated change that affects the demand or the hours of operation used in the set of forecasts. For example, when another pharmacy in a nearby location reduces the hours of operation or another pharmacy goes out of business, a potential increase in volume for demand in that location can be anticipated. In such an example, the trend catchup can update the set of forecasts for the increased demand.

In some embodiments, block 610 optionally can include a block 614 of retrieving trend parameters. In several embodiments, trend parameters of the trend catch up feature can include the hours of operation or the number of staff members based on the potential increase in volume of demand.

In many embodiments, block 610 also can include a block 615 of assigning forecast intervals. Block 615 can be similar or identical to block 403 (FIG. 4). In some embodiments, assigning forecast intervals or time intervals can include converting the time it can take to perform a forecasted task and/or subtask into individual time intervals, such as 15 minute time intervals. In several embodiments, block 615 each time interval can capture performance of multiple forecast tasks and subtasks.

In various embodiments, block 610 optionally can include a block 616 of intercepting a forecast. In some embodiments, a forecast intercept feature can include overwriting forecasted data based on historical records during a time period. For example, a forecast for a store during a pandemic previously indicated a low demand for a day or week based on previous historical records and/or the current forecast data. By using the forecast intercept feature, a manual adjustment can be entered based on new data anticipated by the store location.

In several embodiments, method 600 additionally can include a block 620 of generating a demand. Block 620 can be similar or identical to block 404 (FIG. 4). In many embodiments, generating a demand can include a demand associated with the time intervals and a demand associated with a number of staff to employ during a period of time.

In various embodiments, block 620 can include a block 630 of converting parameters into time periods taken by each staff role to perform a given activity of the parameter. Block 630 can be similar or identical to block 405 (FIG. 4). In some embodiments, block 630 can include a block 631 of generating a raw demand. Block 631 can be similar or identical to block 405 (FIG. 4). In various embodiments, block 630 further can include a block 632 of applying an uplift. Block 632 can be similar or identical to block 405 (FIG. 4). In many embodiments, block 630 also can include a block 633 of applying a fixed demand. Block 633 can be similar or identical to block 405 (FIG. 4). In several embodiments, block 639 additionally can include a block 634 of applying a smoothing algorithm. Block 634 can be similar or identical to block 406 (FIG. 4).

In a number of embodiments, block 620 also can include a block 640 of converting intervals of time to a number of people to employ. Block 640 can be similar or identical to block 407 (FIG. 4). In many embodiments, block 640 can include a block 641 of applying a rounding algorithm. Block 641 can be similar or identical to block 408 (FIG. 4). In various embodiments, block 640 additionally can include a block 642 of performing a demand calculation. Block 642 can be similar or identical to block 409 (FIG. 4).

Figure 7:
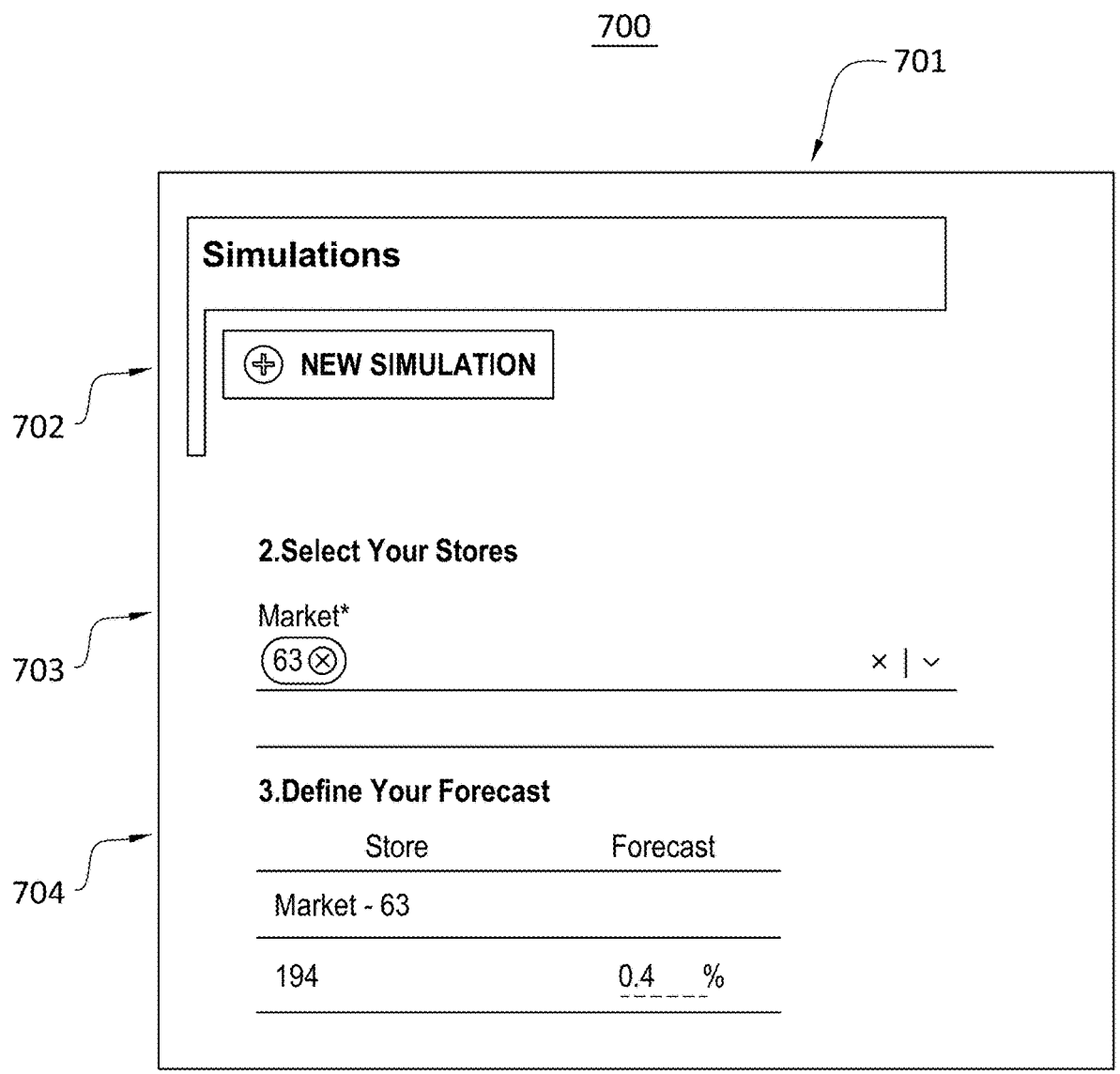
FIG. 7 illustrates an exemplary user interface display, according to another embodiment.

Turning ahead in the drawings, FIG. 7 illustrates an exemplary user interface display 700, according to another embodiment. In many embodiments, user interface display 700 is merely exemplary and can be employed in many different embodiments or examples not specifically depicted or described herein. In a number of embodiments, user interface display 700 can be an interactive webpage or software application (app) display to allow a user to create a customized simulation that generates a customized (e.g., optimized) staffing schedule each day for one or more stores. In some embodiments, user interface display 700 can include a new simulation input form 701, which can include a new simulation bar 702, a selection bar 703, and a defining bar 704.

In several embodiments, new simulation input form 701 can be displayed as an interactive webpage on a user interface of a computing device and/or a user computer, such as user computer 340-341 (FIG. 3). New simulation input form 701 can be used by a user to enter one or more parameters, or drivers, and/or data to run a new simulation for a store or multiple stores.

In many embodiments, new simulation bar 702 can allow a user to create a new simulation to generate a proposed staffing schedule using scheduling engine 310 (FIG. 3). In some embodiments, new simulation bar 702 can be activated to run a new or first simulation that outputs a proposed staffing demand. In a number of embodiments, the output can include a corresponding staffing schedule based on the relationships between the various input parameters and/or drivers and the staffing demand of a store for a pre-determined time period.

In various embodiments, selection bar 703 can allow a user to customize the new simulation being created for a specific store or multiple stores. For example, the user can input data to run a simulation for store, such as store number 63, as shown in FIG. 7.

In several embodiments, defining bar 704 can allow the user to further customize the new simulation by defining a forecast for each store that was input into the new simulation user interface. In some embodiments, a forecast parameter can be defined as a field simulator feature that allows a user to run multiple simulations based on multiple different forecast parameters. As an example, the user can define a forecast for a store ID, such as Market-63 or 194, by setting a forecast parameter. For example, the user can input a forecast parameter of a projected increase in demand to 0.4%.

Figure 8:
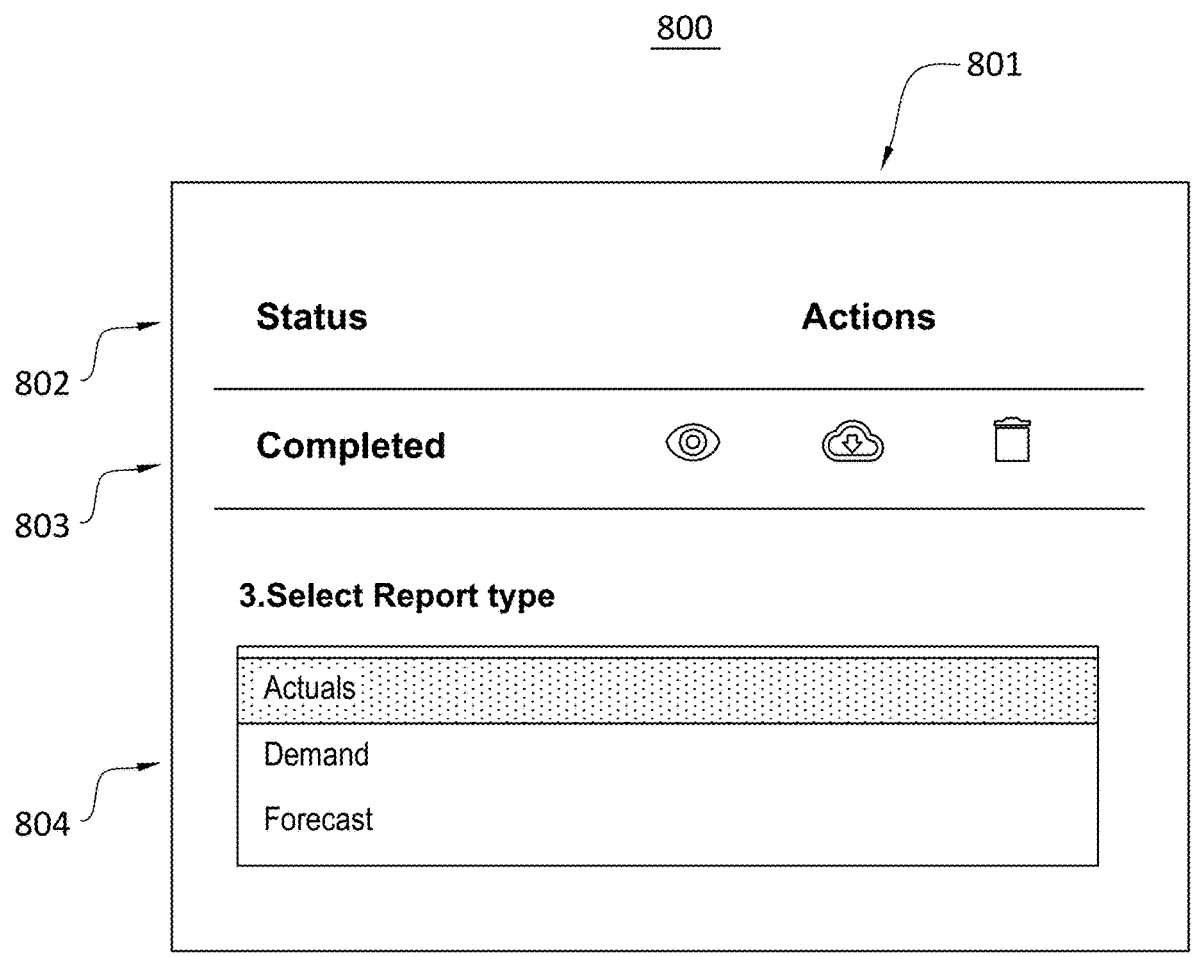
FIG. 8. illustrates an exemplary user interface display, according to another embodiment.

Turning ahead in the drawings, FIG. 8 illustrates an exemplary user interface display 800, according to another embodiment. In many embodiments, user interface display 800 is merely exemplary and can be employed in many different embodiments or examples not specifically depicted or described herein. In a several embodiments, user interface display 800 can be an interactive webpage or an app display that can allow a user to select a report type in order to view results of a customized simulation, such as the customized simulation created using user interface display 700 (FIG. 7). In some embodiments, user interface display 800 can include a results form 801, which can include a status header 802, a results bar 803, and a selection report bar 804.

In many embodiments, status header 802 can include a header for a status column for indicating the progress of a simulation in process and/or completed, and a header for an action column that can indicate actions and/or recommendations for the simulation based on the status of the simulation.

In various embodiments, results bar 803 can indicate that a simulation has been completed. In some embodiments, the status of a simulation can include status progress indicators such as initiated, pending, or completion. In several embodiments, the progress status of a simulation can include an error or malfunction message for the user that can promote an alternate action such as deleting the new simulation, re-starting the new simulation, modifying the parameters of the new simulation, and/or another suitable message for the user. In many embodiments, results bar 803 can include multiple buttons for viewing, saving, deleting and/or another suitable action related to the new simulation as selected by the user.

In various embodiments, selection bar 804 can allow the user to select a report type for the completed simulation from among multiple report types, such as actuals, demand, forecast, and/or other suitable report types.

Turning ahead in the drawings, FIG. 9 illustrates an exemplary interface display 900, according to another embodiment. In many embodiments, user interface display 900 is merely exemplary and can be employed in many different embodiments or examples not specifically depicted or described herein. In various embodiments, user interface display 900 can include an interactive webpage or a software application display such as the exemplary user interface 700 (FIG. 7). In some embodiments, user interface display 900 can include simulation listing 901, which can include status icons 902, simulation names 903, a number of stores column 904, a simulation creation data column 905, a creation date column 906, a modified date column 907, an effective date column 908, a simulations status column 909, and action icons 910. User interface display 900 can be similar to user interface display 700 (FIG. 7).

In several embodiments, simulation listing 901 can indicate a user has run a new simulation for one store, three stores, 1,000 stores, 5,000 stores, and/or other suitable numbers of stores, as shown in status icons 902, simulation names 903, and/or a number of stores 904. In many embodiments, simulation listing 901 can display a listing of previously run simulations such that multiple simulations can be run in parallel to efficient implement various drivers and various levels of demand for each of the stores.

In many embodiments, simulation listing 901 can display a date the simulation was created, a modification to the date the simulation was created, and effective date of the simulation, as shown in creation date 906, modified date 907, effective date 908, respectively. In some embodiments, simulation listing 901 can display a listing of tests by a status of that test, as shown in simulations status 909. Such status identifiers can include a draft format, a running status format, a completed format, and/or another suitable status indicators for a new simulation In several embodiments, simulation listing 901 can include indicators and/or icons to save, delete, or publish the report, as shown in action icons 910. In many embodiments, simulation listing 901 can be used to publish or transmit the report from the interactive user interface to each store user interface for implementation of the proposed store schedule, as also shown in action icons 910.

For example, once a simulation to generate a staffing schedule has been run, a staffing report generated by the simulation can be published to one or more stores, or even thousands of stores, as a proposed staffing report with such data as recommended hours of operation, recommended days of the week to open, a number of staffing recommendations by roles and each time interval indicating the number of people to employ for each day. Such a staffing report can include a day-level schedule, a week-level schedule, a month-level schedule and/or any suitable level of time. In many embodiments, simulation listing 901 can include multiple simulations that can be run by changing one or more drivers or parameters that can modified, which can result in a different or same outcome in the new version of a staffing schedule report.

Figure 10:
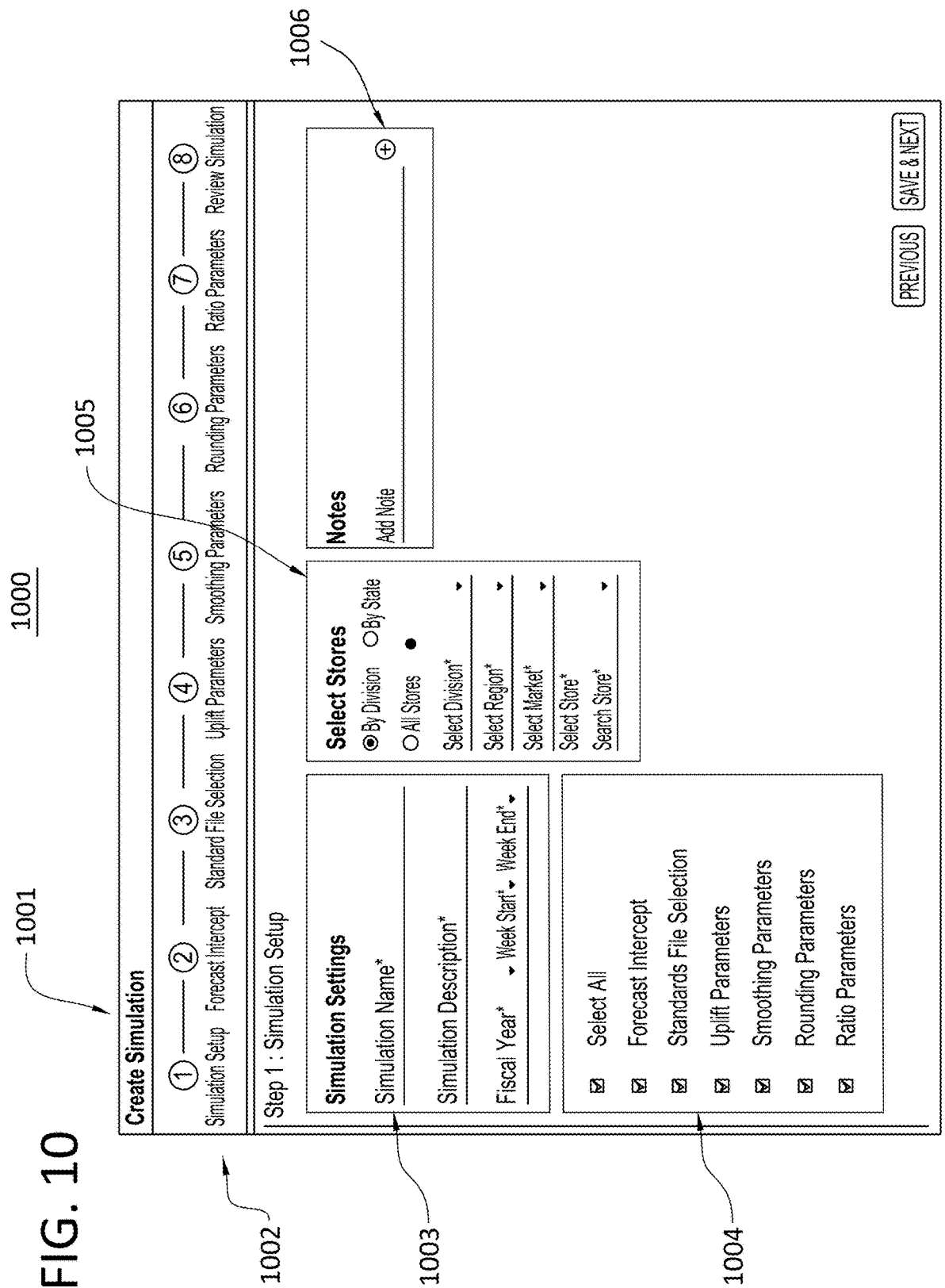
FIG. 10 illustrates an exemplary user interface display, according to another embodiment.

Turning ahead in the drawings, FIG. 10 illustrates an exemplary user interface display 1000, according to another embodiment. In many embodiments, user interface display 1000 is merely exemplary and can be employed in many different embodiments or examples not specifically depicted or described herein. In various embodiments, a user interface display 1000 can be an interactive webpage or an app display that can set up details of a customized simulation that generates a customized (e.g., optimized) staffing schedule each day for one or more stores. In many embodiments, user interface display 1000 can include a setup form 1001, which can include a setup progress indicator 1002, a simulation settings form 1003, a simulation descriptor 1004, a stores selector 1005, and a notes form 1006. User interface display 1000 can be similar to user interface display 700 (FIG. 7).

In many embodiments, setup form 1001 can display a webpage used to create and/or run a simulation. In several embodiments, setup progress indicator 1002 can include multiple indicators displaying a series of stages pertaining to the simulation, such as a simulation set up, a forecast intercept, a standard file selection, uplift parameters, smoothing parameters, rounding parameters, ratio parameters and review simulation, as described above in FIG. 4.

In some embodiments, simulation settings form 1003 can allow a user to enter data of simulation settings used to identify the simulation name, simulation description, and/or another suitable parameter used to set up a new simulation. In many embodiments, simulation descriptor 1004 can include various inputs that can be entered by the user such as a forecasting setting, a standards file selection, uplift parameters, smoothing parameters, rounding parameters, ratio parameters, and/or other suitable parameters, as also described above in FIG. 4. In some embodiments, simulation descriptor 1004 can include a select all button or icon to allow the user to select all of the various inputs that can be entered by the user.

In various embodiments, stores selector 1005 can allow the user to input data associated with a single store, multiple stores, and/or all of the stores of a retailer by selecting one or more interactive buttons or icons. In several embodiments, notes form 1006 can include a section for notes that can be entered by the user.

In some embodiments, one of the advantages of using a scheduling engine to recommend staffing schedules can be the ability to adjust to different drivers or changes to government laws and regulation. Using a scheduling engine to run simulations by modifying different drivers can improve the efficiency and speed of generating new staffing schedules over conventional systems, which can beneficially result in a reduction in processor use and memory cache.

In a number of embodiments, another advantage of using an automated scheduling system is the ability to effortlessly provide a reaction to a change in a driver or a parameter given little notice of the change. For example, a modification or change in a regulation in response to a national health crisis (e.g., a pandemic) can be implemented by generating a number of hours of operation per day for a store, recommending a number of people based on the different roles each person can perform to meet a modified demand for services (e.g., pharmacy services) on a day. In some embodiments, another advantage of the scheduling engine can be providing a tool to help evaluate a ground zero impact at a chain of stores by being equipped to adapt to the changing demands of customers or patients based on the modification of an event.

In many embodiments, the techniques described herein can provide several technological improvements. For example, the techniques described herein can beneficially make determinations based on real-time information that describes automatically creating one or more staffing schedules based on changing parameters or drivers, such as a national health crisis and/or legal standards.

In many embodiments, the techniques described herein can be used continuously at a scale that cannot be handled using manual techniques. For example, experiments have shown the time taken to complete a simulation of a staffing schedule for over 5,200 stores for a single fiscal year can be completed in less than two hours, as compared to a conventional approach (e.g. manual techniques) that can take up to 3 days for the same number of stores.

In a number of embodiments, the techniques described herein can solve a technical problem that arises only within the realm of computer networks, such as determining the hours of operation of a store providing pharmaceutical services during a national health crisis, such as a pandemic. Moreover, the techniques described herein can solve a technical problem that cannot be solved outside the context of computer networks. Specifically, the techniques described herein cannot be used outside the context of computer networks, in view of a lack of data that can be used to rapidly adapt and/or modify staffing schedules for a pharmacy, and because a part of the techniques described herein would not exist.

Various embodiments can include a system including one or more processors and one or more non-transitory computer-readable media storing computing instructions configured to run on the one or more processors and perform certain acts. The acts can include generating a staffing demand. Generating the staffing demand can include converting the each forecasted task at the respective time slot into a respective time interval taken by each staffing role of staffing roles to complete the each of one or more respective subtasks of the each forecasted task during the respective time slot. Converting the each forecasted task can include applying a smoothing algorithm to normalize the respective time intervals performed across a window of multiple respective time slots of the predetermined time slots. Generating the staffing demand can include converting the respective time intervals into a respective proposed staffing schedule for each of the one or more stores, the respective proposed staffing schedule comprising a respective minimum number of staff to employ for each of the staffing roles at each of the one or more stores during the each respective time slot of the predetermined time slots. Converting the respective time intervals can include rounding the respective minimum number of staff for the each of the staffing roles based on the respective time intervals taken to perform the respective subtasks during the each respective time slot. Converting the respective time intervals also can include analyzing the respective minimum number of staff across the staffing roles in the proposed staffing schedule for compliance with a ratio compliance standard. The acts additionally can include transmitting the respective proposed staffing schedule to a respective interface of a respective user device for each of the one or more stores.

A number of embodiments can include a method. The method can be implemented via execution of computing instructions configured to run on one or more processors and stored at one or more non-transitory computer-readable media. The method can include generating a staffing demand. The method also can include converting the each forecasted task at the respective time slot into a respective time interval taken by each staffing role of staffing roles to complete the each of one or more respective subtasks of the each forecasted task during the respective time slot. Additionally, converting the each forecasted task can include applying a smoothing algorithm to normalize the respective time intervals performed across a window of multiple respective time slots of the predetermined time slots. The method also can include converting the respective time intervals into a respective proposed staffing schedule for each of the one or more stores, the respective proposed staffing schedule comprising a respective minimum number of staff to employ for each of the staffing roles at each of the one or more stores during the each respective time slot of the predetermined time slots. The method also can include converting the respective time intervals by rounding the respective minimum number of staff for the each of the staffing roles based on the respective time intervals taken to perform the respective subtasks during the each respective time slot. Further the converting the respective time intervals can include analyzing the respective minimum number of staff across the staffing roles in the proposed staffing schedule for compliance with a ratio compliance standard. The method also can include transmitting the respective proposed staffing schedule to a respective interface of a respective user device for each of the one or more stores.

Although the scheduling engine has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 4 and 6 may include different procedures, processes, and/or activities and be performed by many different modules, in many different orders, and/or one or more of the procedures, processes, or activities of FIGS. 4 and 6 may include one or more of the procedures, processes, or activities of another different one of FIGS. 4 and 6. As another example, the systems within scheduling engine 310 (FIGS. 3 and 5) and/or webserver 320 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

The invention claimed is:
1. A system comprising:
one or more processors; and
one or more non-transitory computer-readable media storing computing instructions that, when executed on the one or more processors, cause the one or more processors to perform:
collecting historical data comprising day-level aggregate data of tasks performed each day over a historical time period for one or more stores, wherein each task comprises respective subtasks performed each day;
forecasting a demand for services for the one or more stores over a predetermined time period based on the historical data, as collected;

creating, using the demand for services, historical day-level tasks of the day-level aggregate data of the tasks comprising (i) each task and each subtask performed throughout each day over the predetermined time period and (ii) staffing roles taken in performing the tasks and subtasks for each day;

training a machine learning forecasting algorithm based on input data comprising the historical day-level tasks of the day-level aggregate data of the tasks within a time period at the one or more stores and an output of forecasted tasks comprising individual time intervals of each of the historical day-level tasks for one or more time periods at the one or more stores;

generating, using the machine learning forecasting algorithm, as trained, one or more forecasted tasks to be performed during an upcoming time period at the one or more stores, wherein the one or more forecasted tasks comprise one or more forecasted day-level tasks;

generating a staffing demand, comprising:
 converting each forecasted task of the one or more forecasted tasks at a respective time slot of predetermined time slots into a respective time interval taken by each staffing role of the staffing roles to complete each of one or more respective subtasks of each forecasted task of the one or more forecasted tasks during the respective time slot, further comprising:
  applying a smoothing algorithm to normalize respective time intervals performed across a window of multiple respective time slots of the predetermined time slots; and
 converting the respective time intervals into a respective proposed staffing schedule for each of one or more stores, the respective proposed staffing schedule comprising a respective minimum number of staff to employ for each of the staffing roles at each of the one or more stores during each respective time slot of the predetermined time slots, further comprising:
  rounding the respective minimum number of staff for each of the staffing roles based on the respective time intervals taken to perform respective subtasks during each respective time slot; and
  analyzing the respective minimum number of staff across the staffing roles in the respective proposed staffing schedule for compliance with a ratio compliance standard; and
 transmitting the respective proposed staffing schedule to a respective interface of a respective user device for each of the one or more stores.

2. The system of claim 1, wherein the computing instructions, when executed on the one or more processors, further cause the one or more processors to perform:
converting, using the machine learning forecasting algorithm, as trained, the input data from a single day-level collection into the individual time intervals for upcoming time periods;
assigning each forecasted task of the forecasted tasks to each respective time slot of the predetermined time slots for the one or more stores;
receiving modifications to at least one of one or more parameters used to generate the staffing demand, the one or more of the forecasted tasks, or the one or more respective subtasks associated with one or more of the one or more forecasted tasks;
running simulations based on the modifications to generate modified proposed staffing schedules; and
selecting one of the modified proposed staffing schedules generated in the simulations.

3. The system of claim 2, wherein:
the historical time period for the one or more stores is at least two years;
the tasks performed during each day across the historical time period comprises tasks associated with prescriptions;
the one or more stores comprise one or more pharmacies;
the one or more forecasted tasks comprise receiving prescriptions, filling prescriptions, and picking up prescriptions; and
the machine learning forecasting algorithm further comprises at least one of:
 a time series forecasting approach;
 a time series analysis method of forecasting approach comprising a seasonal and trending (STL) decomposition model;
 an STL decomposition model with autoregressive moving average models; or
 one or more statistical forecasting approaches comprising random forests, regression analysis, and a smoothing technique.

4. The system of claim 1, wherein the upcoming time period is at least fifteen weeks.

5. The system of claim 1, wherein a duration of each of the multiple respective time slots of the predetermined time slots is fifteen minutes.

6. The system of claim 1, wherein converting each forecasted task of the one or more forecasted tasks at the respective time slot into the respective time interval taken by each staffing role of the staffing roles further comprises:
determining the one or more respective subtasks using a database that maps each forecasted task of the one or more forecasted tasks to the one or more respective subtasks.

7. The system of claim 1, wherein converting each forecasted task of the one or more forecasted tasks at the respective time slot into the respective time interval taken by each staffing role of the staffing roles further comprises, before applying the smoothing algorithm:
applying an uplift time period based on a relaxing factor for specific staffing roles of the staffing roles at specific stores of the one or more stores; and
applying an additional fixed demand time for the specific staffing roles to perform one or more chores beyond the one or more forecasted tasks.

8. The system of claim 1, wherein the smoothing algorithm comprises:
performing an average operation across the window of the multiple respective time slots to normalize the respective time intervals.

9. The system of claim 1, wherein rounding the respective minimum number of staff for each of the staffing roles further comprises:
performing a comparison of a sum of the respective time intervals taken to perform the respective subtasks across the respective minimum number of staff for the staffing roles against predetermined ranges of total time; and
adjusting the respective minimum number of staff for the staffing roles based on the comparison of the sum against the predetermined ranges of total time.

10. The system of claim 1, wherein converting the respective time intervals into the respective proposed staffing schedule for each of the one or more stores further comprises, before analyzing the respective minimum number of staff across the staffing roles:
comparing the respective minimum number of staff for each of the staffing roles against historical minimum staffing criteria and task capabilities of each of the staffing roles.

11. A method being implemented via execution of computing instructions configured to run on one or more processors and stored at one or more non-transitory computer-readable media, the method comprising:
collecting historical data comprising day-level aggregate data of tasks performed each day over a historical time period for one or more stores, wherein each task comprises respective subtasks performed each day;
forecasting a demand for services for the one or more stores over a predetermined time period based on the historical data, as collected;
creating, using the demand for services, historical day-level tasks of the day-level aggregate data of the tasks comprising (i) each task and each subtask performed throughout each day over the predetermined time period and (ii) staffing roles taken in performing the tasks and subtasks for each day;
training a machine learning forecasting algorithm based on input data comprising the historical day-level tasks of the day-level aggregate data of the tasks within a time period at the one or more stores and an output of forecasted tasks comprising individual time intervals of each of the historical day-level tasks for one or more time periods at the one or more stores;
generating, using the machine learning forecasting algorithm, as trained, one or more forecasted tasks to be performed during an upcoming time period at the one or more stores, wherein the one or more forecasted tasks comprise one or more forecasted day-level tasks;
generating a staffing demand, comprising:
converting each forecasted task of the one or more forecasted tasks at a respective time slot of predetermined time slots into a respective time interval taken by each staffing role of the staffing roles to complete each of one or more respective subtasks of each forecasted task of the one or more forecasted tasks during the respective time slot, further comprising:
applying a smoothing algorithm to normalize respective time intervals performed across a window of multiple respective time slots of the predetermined time slots; and
converting the respective time intervals into a respective proposed staffing schedule for each of one or more stores, the respective proposed staffing schedule comprising a respective minimum number of staff to employ for each of the staffing roles at each of the one or more stores during each respective time slot of the predetermined time slots, further comprising:
rounding the respective minimum number of staff for each of the staffing roles based on the respective time intervals taken to perform respective subtasks during each respective time slot; and
analyzing the respective minimum number of staff across the staffing roles in the respective proposed staffing schedule for compliance with a ratio compliance standard; and
transmitting the respective proposed staffing schedule to a respective interface of a respective user device for each of the one or more stores.

12. The method of claim 11, further comprising:
converting, using the machine learning forecasting algorithm, as trained, the input data from a single day-level collection into the individual time intervals for upcoming time periods;
assigning each forecasted task of the forecasted tasks to each respective time slot of the predetermined time slots for the one or more stores;
receiving modifications to at least one of one or more parameters used to generate the staffing demand, the one or more of the forecasted tasks, or the one or more respective subtasks associated with one or more of the one or more forecasted tasks;
running simulations based on the modifications to generate modified proposed staffing schedules; and
selecting one of the modified proposed staffing schedules generated in the simulations.

13. The method of claim 12, wherein:
the historical time period for the one or more stores is at least two years;
the tasks performed during each day across the historical time period comprises tasks associated with prescriptions;
the one or more stores comprise one or more pharmacies;
the one or more forecasted tasks comprise receiving prescriptions, filling prescriptions, and picking up prescriptions; and
the machine learning forecasting algorithm further comprises at least one of:
a time series forecasting approach;
a time series analysis method of forecasting approach comprising a seasonal and trending (STL) decomposition model;
an STL decomposition model with autoregressive moving average models; or
one or more statistical forecasting approaches comprising random forests, regression analysis, and a smoothing technique.

14. The method of claim 11, wherein the upcoming time period is at least fifteen weeks.

15. The method of claim 11, wherein a duration of each of the multiple respective time slots of the predetermined time slots is fifteen minutes.

16. The method of claim 11, wherein converting each forecasted task of the one or more forecasted tasks at the respective time slot into the respective time interval taken by each staffing role of the staffing roles further comprises:
determining the one or more respective subtasks using a database that maps each forecasted task of the one or more forecasted tasks to the one or more respective subtasks.

17. The method of claim 11, wherein converting each forecasted task of the one or more forecasted tasks at the respective time slot into the respective time interval taken by each staffing role of the staffing roles further comprises, before applying the smoothing algorithm:
applying an uplift time period based on a relaxing factor for specific staffing roles of the staffing roles at specific stores of the one or more stores; and
applying an additional fixed demand time for the specific staffing roles to perform one or more chores beyond the one or more forecasted tasks.

18. The method of claim 11, wherein the smoothing algorithm comprises:

performing an average operation across the window of the multiple respective time slots to normalize the respective time intervals.

19. The method of claim 11, wherein rounding the respective minimum number of staff for each of the staffing roles further comprises:

performing a comparison of a sum of the respective time intervals taken to perform the respective subtasks across the respective minimum number of staff for the staffing roles against predetermined ranges of total time; and adjusting the respective minimum number of staff for the staffing roles based on the comparison of the sum against the predetermined ranges of total time.

20. The method of claim 11, wherein converting the respective time intervals into the respective proposed staffing schedule for each of the one or more stores further comprises, before analyzing the respective minimum number of staff across the staffing roles:

comparing the respective minimum number of staff for each of the staffing roles against historical minimum staffing criteria and task capabilities of each of the staffing roles.

\* \* \* \* \*